United States Patent Office 3,718,910
Patented Feb. 27, 1973

3,718,910
TIME COHERENT SAMPLING SYSTEM FOR ELIMINATING THE EFFECTS OF TEST SYSTEM JITTER AND PROVIDING A SIMPLIFIED SINGLE TRANSIENT THRESHOLD TEST
Eugene J. Scray, Jr., Burlington, and Donald L. Wilder, Colchester, Vt., assignors to International Business Machines Corporation, Armonk, N.Y.
Filed Sept. 30, 1970, Ser. No. 76,914
Int. Cl. G06f 1/00
U.S. Cl. 340—172.5    11 Claims

ABSTRACT OF THE DISCLOSURE

A sampling system obtains simultaneous time coherent samples from multiple waveforms. For processing, the samples are transferred to a permanent storage means, while retaining their time coherency. The retained time coherency allows the processing to remove the effects of test system jitter. The sampling system also provides a simplified threshold test to determine whether a single transient exceeds a threshold voltage at a predetermined time. A sample storage capacitor connected to the output of a sampling gate is preset to the threshold voltage and the sampling gate is momentarily closed at the predetermined time. The direction of any voltage change on the capacitor during the time the sampling gate is closed is detected as an indication of whether the threshold is exceeded. Simultaneous time coherent threshold determinations are obtained by the sampling system.

BACKGROUND OF THE INVENTION

(1) Field of the invention

The invention relates to the field of sampling and more particularly to the field of sampling oscilloscopes and sampling input systems for computers.

(2) Prior art

It is known in the prior art to simultaneously sample two waveforms in a sampling oscilloscope. In the sampling oscilloscope, the samples from the two different waveforms are displayed on successive traces of the electron beam in the cathode ray tube (CRT). The successive sweeps of the electron beam are triggered by a sweep trigger generator and a sweep trigger circuit. Both the sweep trigger generator and the sweep trigger circuit introduce jitter in the timing of the successive sweeps of the electron beam. Therefore, in displaying the two samples, jitter is introduced. Any determination of the jitter between the two waveforms contains errors due to the jitter introduced by the sweep trigger generator and the sweep trigger circuit.

It is known in the prior art to determine the voltage of a waveform at a given point by using a sampling gate to successive samples at the given point in the wavefo on successive repetitions of the waveforms. The voltage on a sampling storage capacitor connected to the output of the sampling gate is built up to a steady state level by the successive samples. The steady state level is then measured to determine the voltage at the given point in the waveform. It is also known to use an amplifier to amplify the voltage on the sampling storage capacitor and to feedback the amplifier output voltage to the storage capacitor in order to reduce to approximately three the number of samples necessary to raise the voltage on the storage capacitor to the steady state level. When the steady state level is derived by the use of two or more samples, only an average value of the voltage of the waveform at the given point can be measured since the voltage on the sampling capacitor is an average. The value of the voltage on the storage capacitor is also subject to errors because of the different samples being taken at slightly different times because of jitter in the trigger which closes the sampling gate. Therefore as long as the average voltage at the given point in the waveform exceeds the threshold voltage the test will indicate that the threshold is exceeded, even though during some repetitions of the waveform the threshold may not be reached. Thus this test is not an accurate indication of the waveform's minimum voltage at the given point.

It is also known in the prior art to amplify the output of the sampling gate directly, rather than storing the sample on a sampling storage capacitor. By using expensive components such as three DC amplifiers, including one differential DC amplifier, this prior art can obtain a threshold determination from one occurrence of a waveform.

OBJECTS

The primary object of the present invention is to obtain, for processing, voltage samples from two or more waveforms in such a way that the samples have a known jitter-free time relationship to each other.

Another object of the invention is to obtain sample representations of multiple waveforms in which although there is jitter between samples in each waveform, there is no jitter between corresponding samples of different waveforms.

Still another object of the invention is to make a voltage threshold determination on a single occurrence of a transient wavefom in a simplified and improved manner.

A further object of the invention is to make the threshold determination on a simple occurrence of a transient waveform without the need for accurate DC amplification.

A still further object of the invention is to make simultaneous coherent threshold determinations on two or more waveforms.

DEFINITIONS

For purposes of this invention, a device or measurement is jitter free, if the amount of jitter present is too small to adversely affect the desired measurement.

A temporary storage means is a storage device in which the value stored decays with time. A storage capacitor is such a temporary storage means, since the magnitude of the voltage stored thereon decreases steadily with time.

A permanent storage means is one on which the stored value does not change with time, or one in which the original stored value can be accurately regenerated periodically, so that the storage remains accurate. Some examples of permanent storage means are a digital core memory, magnetic tape, a capacitive digital memory, similar digital storage devices and record of an analog value produced on paper by an XY plotter.

A single-transient threshold determination means is a device which from a single sample can determine accurately whether a waveform's voltage at the time the sample is taken is less than, equal to, or greater than the threshold voltage.

Time-coherent samples or time-coherent threshold determinations are samples or threshold determinations which have a known time relationship which is free from test system jitter.

SUMMARY

The invention is an improved sampling system for obtaining data from test waveforms, particularly data which can be computer processed to obtain desired information about the test waveforms.

The invention obtains time coherent samples from two or more waveforms by simultaneously closing a set of sampling gates, one gate for each waveform to be sampled. The samples are temporarily stored on a temporary storage means such as a capacitor. The values of the samples are then converted to digital numbers by an analog-to-digital converter. The digital numbers are stored in a digital memory along with the time at which the samples were taken. These samples can be used to reconstruct the waveform and for processing to determine the characteristics of the waveforms. The position, spacing and the time between the samples can be computer controlled, if desired.

A voltage threshold test is made on a single occurrence of a transient waveform in a simplified fashion. The threshold voltage is impressed on a sampling storage capacitor located at the output of the sampling gate. While the sampling gate is closed in order to sample the transient waveform, the direction of any voltage change on the capacitor is detected. A voltage increase on the sampling storage capacitor will therefore indicate that the transient under study was greater than the static voltage previously stored on the sampling storage capacitor. Conversely, a voltage decrease on the sampling storage capacitor will indicate a transient less than the static voltage previously stored on the sampling storage capacitor. The advantage of this system is that it reduces the total amount of energy extracted or delivered to the device or transient under test. Furthermore, it permits increased accuracy to be realized since variations in sampling storage efficiency no longer directly affects accuracy. This simplified test system reduces the net amount of energy that is extracted from or delivered to the transient under test.

The sampling system obtains time coherent threshold data or time coherent data from two or more waveforms by presetting a set of sampling gates, one for each waveform, to the desired threshold values and then simultaneously closing the sampling gates at the time the threshold data is desired. This system provides jitter-free data for comparing the various waveforms.

The above and other objects and advantages of the invention will be apparent from the following more particular description of the preferred embodiments of the invention, as illustrated in the accompanying drawings.

DETAILED DESCRIPTION

Figure 1:
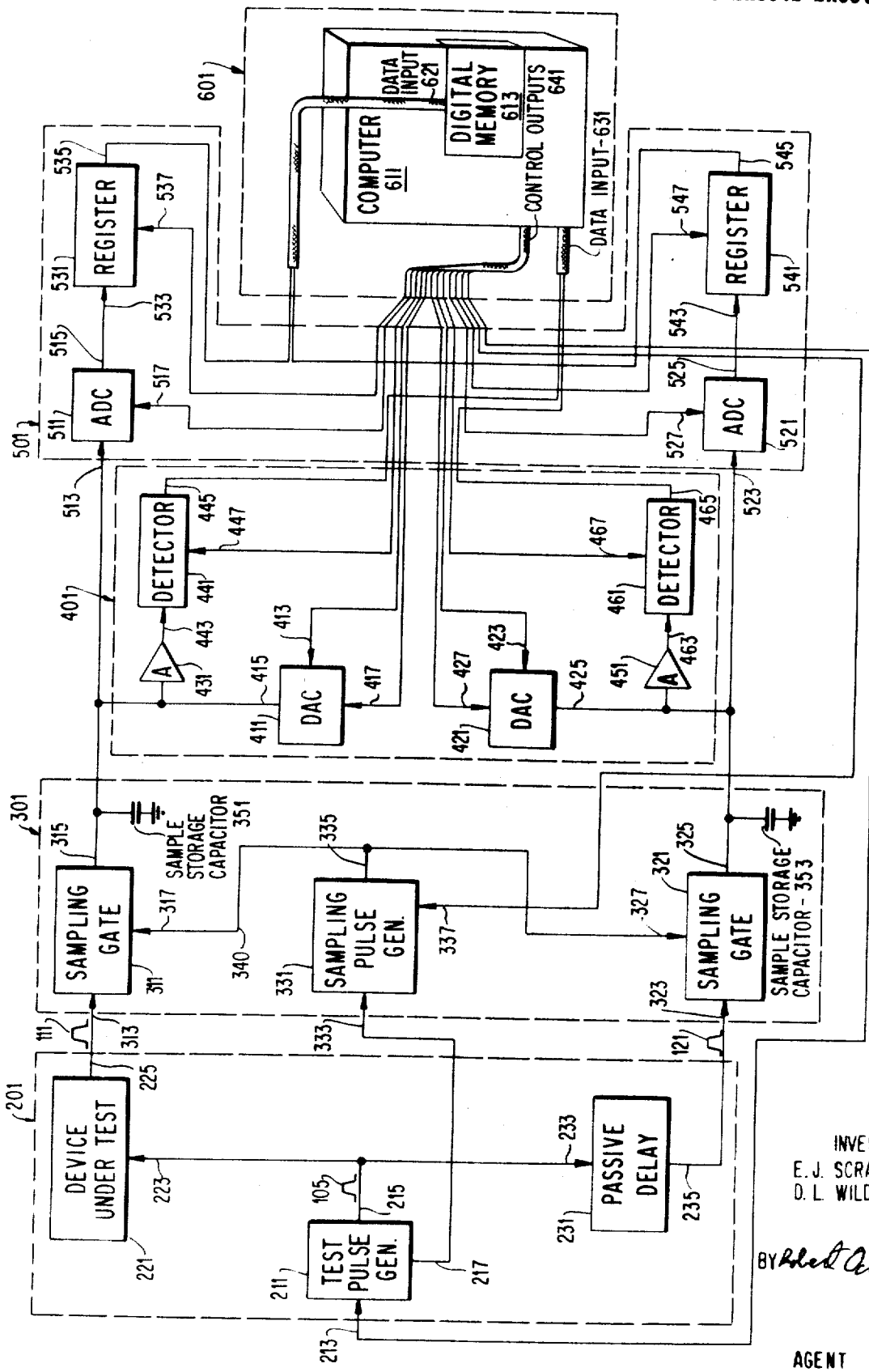
FIG. 1 is a diagram of the preferred time coherent sampling and threshold test system.

The preferred embodiment is best described in terms of five functional blocks into which it may be divided for descriptive purposes. This embodiment is diagrammed in FIG. 1 and is comprised of the following blocks: waveform source 201, sampling means 301, threshold determination means 401, coherent sample transfer means 501, and control means 601. The circuitry of the system has been divided into these five blocks to clarify the explanation of the system and how it works, however, all of the blocks are interrelated.

The waveform source block 201 can be any source of waveforms which it is desired to process using the remainder of the sampling system. The waveform source shown in FIG. 1 is comprised of a test pulse generator 211 which has a control input 213, a signal output 215 and a trigger output 217. The control input is connected to the control means 601. The information presented at control input 213 determines when the test pulse generator 211 produces a trigger output pulse on line 217 and a signal output pulse 215. The trigger output on line 217 is used by sampling means 301 in determining when to take samples. The signal output terminal 215 of the test pulse generator 211 is connected to an input 223 of a device under test 221, and to an input 233 of a passive delay means 231. The device under test 221 has an output terminal 225 which is connected to the sampling means 301. The passive delay 231 has an output 235 which is also connected to the sampling means 301.

The sampling means 301 is comprised of a sampling pulse generator 331, a number of sampling gates, and a number of sample storage capacitors, one sample storage capacitor being associated with each sampling gate. For clarity of the diagram only two sampling gates 311 and 321 have been shown along with their sample storage capacitors 351 and 353, respectively. However, it will be clear to one skilled in the art that a plurality of gates may be employed, to sample a plurality of waveforms, said plurality of waveforms being divided into first and second groups, with each gate sampling a different waveform within a group. If two groups of gates are utilized then either a plurality of delay means or a single delay means is required to differentiate between the sampling time of each group. The sampling pulse generator 331 has a trigger input 333 which is connected to the trigger output 217 of test pulse generator 211. The sampling pulse generator 331 also has an output 335 which is connected to the control inputs of the sampling gates 311 and 321. The sampling pulse generator 331 also has a control input 337 which is connected to control means 601, so that the sampling pulse generator may be controlled by the control means 601. Each of the sampling gates has a signal input, a sample output, and a control input. As shown in FIG. 1, sampling gate 311 has a signal input 313, a sample output 315, and a control input 317. The sampling gate 321 has a signal input 323, a sample output 325 and a control input 327. The signal input 313 of sampling gate 311 is connected to the output 225 of device under test 221. The sample output 315 of sampling gate 311 is connected to sample storage capacitor 351. Signal input 323 of sampling gate 321 is connected to the output 235 of passive delay 231. The sample output 325 of sampling gate 321 is connected to the sample storage capacitor 353. The control inputs 317 and 327 of sampling gates 311 and 321, respectively, are connected to the output 335 of sampling pulse generator 331.

The threshold test means 401 is comprised of a number of digital-to-analog converters (DAC), amplifiers and detectors. There is one DAC, one amplifier and one detector for each sampling gate in sampling means 301. For clarity, only the connections of the threshold test means associated with sampling gates 311 will be described, the connections of the threshold circuit associated with sampling gate 321 being similar. The threshold test means associated with sampling gate 311 is comprised of DAC 411, amplifier 431, and detector 441. The DAC 411 has a digital input 413, an analog output 415 and a control input 417. The amplifier 431 has a single input and a single output. The detector 441 has an input 443, an output 445, and a control input 447. The control means 601 is connected to the control input 447 of the detector 441, control input 417 and digital input 413, both of DAC 411. The output 445 of detector 441 is connected directly to control means 601. The analog output 415 of the DAC 411 is connected to the sample storage capacitor 351. The input of amplifier 431 is also connected to the sample storage capacitor 351. The output of amplifier 431 is connected to input 443 of detector 441.

Coherent sample transfer means 501 is comprised of a set of analog-to-digital converters (ADC) and a set of registers connected to the outputs of the ADC's. One ADC is connected to each sample storage capacitor. ADC 511 being connected to sample storage capacitor 351 and ADC 521 being connected to sample storage capacitor 353. ADC 511 has an analog signal input 513, a digital signal output 515 and a control signal input 517. The analog signal input 513 is connected to sample storage capacitor 351. The digital signal output 515 is connected to a signal input 533 of a register 531. The register 531 has a signal output 535 and a control input 537. The control inputs of the ADC and register are connected to control means 601. The connection of sample storage capacitor 353, ADC 521 and register 541 is similar to the connection of capacitor 351, ADC 511 and register 531.

Control means 601 preferably comprises a computer 611 having a digital memory 613, a number of data inputs 621 and 631 and a number of control outputs 641. The data inputs 621 are connected to the outputs 535 and 545 of registers 531 and 541, respectively, for transferring the numbers in the registers to the digital memory 613. The data inputs 631 are connected to the outputs 445 and 465 of detectors 441 and 461 for transferring the signals at the outputs of the detectors to computer 611 for processing and storage. The control outputs 641 are connected to the control inputs of the various devices in the waveforms source 201, the sampling means 301, the threshold 401, and the coherent sample transfer means 501.

OPERATION OF THE PREFERRED EMBODIMENT

The operation of the preferred embodiment in FIG. 1 will now be described. In response to a control signal received at control input 213 of pulse generator from one of the control outputs 641 of computer 611 the test pulse generator 211 will produce a trigger signal on trigger output 217 followed at a predetermined time later by a test pulse 105 at signal output 215. The test pulse 105 will arrive at input 223 of device under test 221 at the same time as it arrives at input 233 of passive delay 231. The test pulse 105 will pass through passive delay 231 and will form the test waveform 121 at the signal input 323 of sampling gate 321. The test pulse 105 will pass through device under test 221 and form the test waveform 111 at signal input 313 of sampling gate 311. In passing through device test 221 the test pulse will be altered in accordance with the characteristics of the device under test, which may alter the amplitude or the frequency characteristics of the test pulse and/or may introduce a variation in the delay of the test pulse from one repetition to another. The test pulse 105 will pass through the passive delay 231, without change except for being delayed by the delay time (D*t*) of the delay means 231. In order to determine the jitter in the delay of device under test 221 the delay time of delay 231 is set to the average value of the delay of device under test 221. As will be explained below, the variation in the delay of device under test 221 can be determined from the samples to be taken by sampling means 301.

The sampling pulse generator 331 generates a sampling pulse at output 335 in response to the trigger signal provided at trigger input 333 by the test pulse generator 211 and the control input signal received at control input 337 from one of the control outputs 641 of computer 611. The timing of the sampling pulse appearing at output 335 of the sampling pulse generator 331 is adjusted by the control input 337 so that samples may be taken from any desired point on the waveforms 111 and 121. The sampling pulse at output 335 is transmitted to the control inputs 317 and 327 of sampling gates 311 and 321, respectively. In response to the sampling pulse the sampling gates 311 and 321 close for a short predetermined time. The voltage level of the waveform 111 at the signal input 313 of sampling gate 311 during the period the sampling gate is closed is transferred to the sample storage capacitor 351. The voltage level of the waveform 121 at signal input 323 of sampling gate 321 during the time the sampling gate is closed is transferred to the sample storage capacitor 353. Because the samples are taken simultaneously in response to a single sampling pulse the samples are time coherent and contain no jitter introduced by the sampling system. However, to make use of this feature the samples must be transferred to a permanent or temporary storage means, without introducing any amplitude distortion that will destroy the time coherence relationship.

This is accomplished by connecting each sample storage capacitor, capacitor 351, for example, to an analog input of an analog-to-digital converter, ADC 511, for example, which converts the analog voltage stored on the sample capacitor 351 to a digital number at an output 515 of ADC 511. The output of the ADC is then stored in a register such as register 531 until it is convenient to transfer the number to storage in the digital memory 613. If the ADC 511 is a latching ADC, no register such as register 531 is necessary. Once the samples have been taken, all the ADC's are activated simultaneously to convert the analog voltage present at their analog inputs to digital numbers at their outputs. Where non-latching ADC's are used another control signal stores the digital numbers on the outputs of the ADC's in the registers connected to the outputs of the ADC's. Upon presentation of a further control signal to the registers, either simultaneously or individually in sequence, the numbers stored in the registers are transferred to the digital memory 613 for storage. In addition to storing the digital values of the samples in the digital memory 613 the computer must associate each of them with another number indicating the time within the waveforms 111 and 121 the samples were taken. This time is determined by the control signal which was presented to the sampling pulse generator 331 to determine the timing of the samples. The control signal at control input 337 of the sampling pulse generator 331 determines the delay between the receipt of the trigger signal by the sampling generator 331 and the production of the sampling pulse at the output 335 of the sampling pulse generator. Because of the nature of any triggered pulse generator, there will be some jitter in the determination of the time at which the samples were taken. Therefore, the triggering of the sampling pulse generator will introduce jitter between successive samples from the same waveform taken on different repetitions of the waveform, however, there is no test system introduced jitter between samples from different waveforms which are taken simultaneously.

If instead of desiring to determine the level of the waveform during the sampling time it had been desired to instead determine whether the waveform voltage was above or below a threshold value during the sampling time, the threshold determination means 401 would have been used instead of converting the samples to digital numbers through the ADC's 511 and 521 and registers 531 and 541. This test would have operated in the following manner.

Prior to activating the test pulse generator the computer supplies digital values to the digital inputs of the DAC's in the threshold determination means 401. Then in response to a control signal these digital values are converted to analog values at the outputs of the DAC's. Each analog output charges the sample storage capacitor with which it is associated to the analog value. Thus, the digital number presented at the input 413 of DAC 411 is converted to the analog equivalent at output 415 and the sample storage capacitor 351 charges to this voltage. After each of the sample storage capacitors has charged to the analog value, the DAC's are turned off and the signal which activates the test pulse generator 211 is presented at control input 213 as in the previous example. At the same time, the detectors in threshold determination means 401 are activated. The signals proceed through the system in the same manner as in the previous example until the sampling gates close. At each sampling gate one of three situations is possible during the time the sampling gate is closed. First, the signal voltage at the input of the sampling gate may be less than the voltage on the sample storage capacitor 351. If this is the case current will flow from the storage capacitor through the sampling gates to the signal input and the voltage on the storage capacitor will decrease. Second, the signal voltage level at the input of the sampling gate may be the same as the voltage on the sample storage capacitor, in which case no current will flow in either direction through the sampling gate and the voltage on the sample storage capacitor will remain unchanged. Third the signal voltage at the input of the sampling gate may be higher than the voltage on the sample storage capacitor, in that case, current will flow from the signal or sampling gate input to the sample storage capacitor and the voltage on the capacitor will increase. For clarity in explaining what occurs in the remainder of the system in response to the three situations, the discussion will be in terms of sample storage capacitor 351, amplifier 431, and detector 441. As stated above, the detector is acitvated before the test pulse is generated. Activating the detector sets its output to a "no detection" condition. At the time the samples are taken the amplifier 431 and detector 441 are in a stabilized steady state condition. The amplifier 431 is an AC amplifier and the detector 441 is sensitive only to the direction in which the amplifier output moves, and does not depend on the amplitude of that movement, once its detection threshold has been exceeded. Therefore, in response to the first situation where the voltage on the storage capacitor decreases, the output of the amplifier 431 goes negative and is detected by detector 441. The detector 441 upon detecting the negative movement of amplifier 431's output sets the detector's output to its "input decrease" condition. In the second situation, where the voltage on the storage capacitor remains constant the output of amplifier 431 does not change and the output of detector 441 remains in its "no detection" condition. In the third situation, where the voltage on the storage capacitor increases, the output of amplifier 431 increases and is detected by detector 441. Upon detecting the increase the detector's output sets to its "input increased" condition.

Once the detection has been made, the condition of the outputs of the detector is transmitted to computer 611 through data inputs 631. Once all of the detectors have transmitted their outputs to the data inputs 631 of computer 611, the detectors are reset and the system is ready to proceed with another measurement. It is preferred to store the detector's outputs in the digital memory 613 and to store the same indication of the time at which the samples were taken as was done in the previous example.

AN ALTERNATE EMBODIMENT

Figure 2:
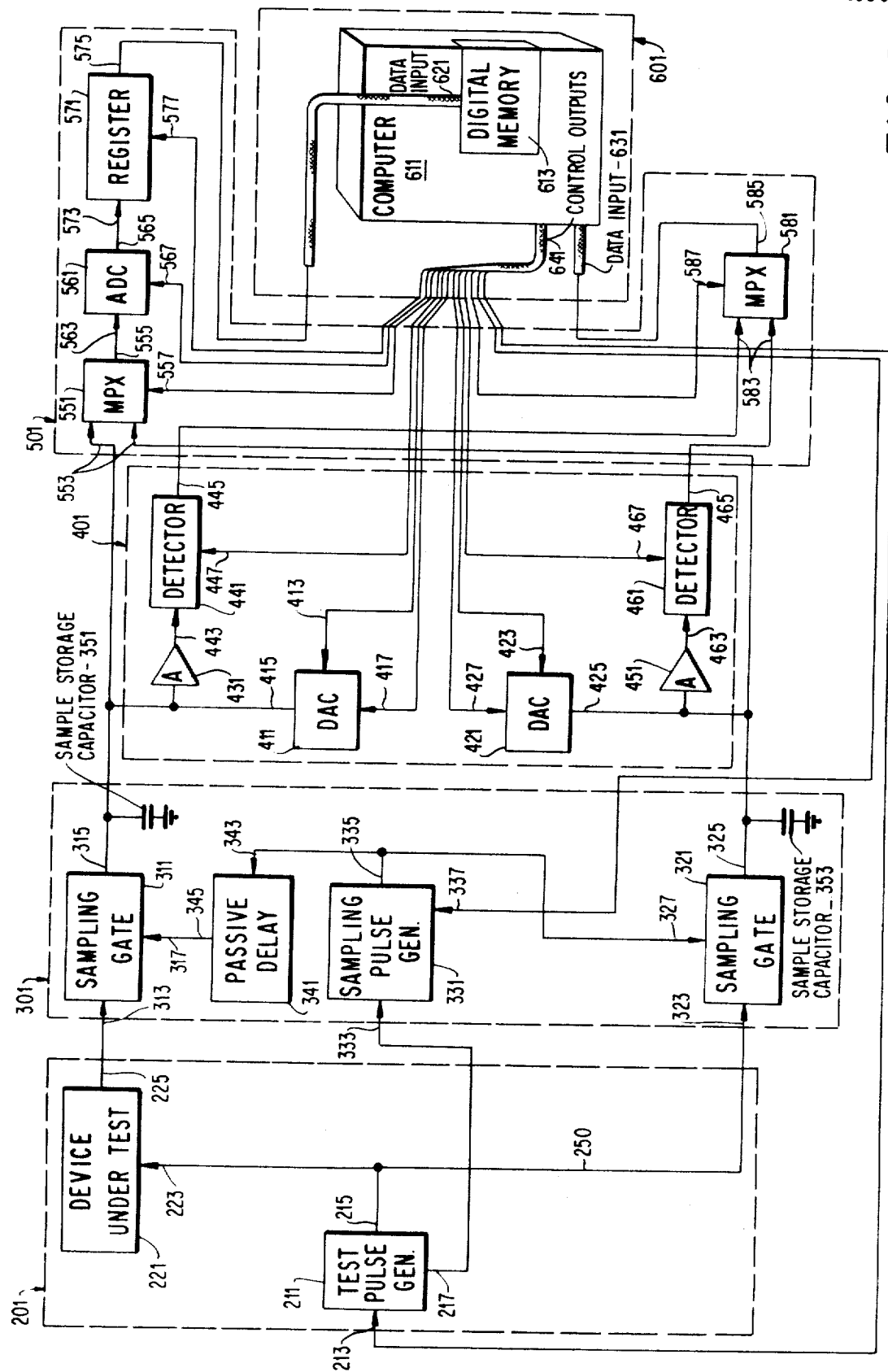
FIG. 2 is a diagram of an alternate time coherent sampling and threshold test system.

An alternate embodiment of the invention is shown in FIG. 2. FIG. 2 is similar to FIG. 1, and only the differences between FIG. 1 and FIG. 2 will be discussed here. The first difference between FIG. 1 and 2 is that in the waveform source 201, there is no passive delay 231 in line 250. The second difference is that a passive delay 341 having an input 343 and an output 345 has been inserted in line 340 between the output 335 of the sampling pulse generator 331 and the control input 317 of the sampling gate 311.

The third change between FIGS. 1 and 2 is that in the coherent sample transfer means 501 is changed and is comprised on a multiplexer 551, and an analog-to-digital converter (ADC) 561, a register 571 and a multiplexer 581. The multiplexer 551 has a number of signal inputs 553, an output 555 and a control input 557. Each of the inputs 553 is connected to one of the sample storage capacitors. In the figure, only two inputs A and B are shown, multiplexer input 553A being connected to sample storage capacitor 351 of sampling gate 311 and multiplexer input 353B being connected to sample storage capacitor 353 of sampling gate 321. The ADC 561 has an input 563, an output 565 and a control input 567 and performs the same function as ADC's 511 and 521 in the preferred embodiment. The output 555 of multiplexer 551 is connected to input 563 of ADC 561. The register 571, being similar to registers 531 and 541, has an input 573, an output 575 and a control input 577. The output 565 of ADC 561 is connected to the input 573 of register 571. The output 575 of register 571, the control input 557 of multiplexer 551, the control input 567 of ADC 561 and the control input 577 of register 571 are connected to control means 601. The multiplexer 581 has a number of inputs 583, an output 585, and a control input 587. In the diagram, only two inputs 583A and 583B are shown. Input 583A is connected to output 445 of the detector 441 which is connected to storage capacitor 351 by amplifier 431. Input 583B is connected to an output 465 of a detector 461 which is connected by an amplifier 451 to the sample storage capacitor 353. The output 585 and the control input 587 of multiplexer 581 are connected to control means 601.

OPERATION OF THE ALTERNATIVE EMBODIMENT

The alternative embodiment operates in the same manner as the preferred embodiment except that, instead of the test pulse 105 passing through the passive delay 231 a passive delay 341 having the same delay time has been inserted between the sampling pulse generator 331 and the control input 317 of sampling gate 311. Therefore, the sampling pulse must be generated sooner in order to sample the same point on the waveform 121 and this same sampling pulse after being delayed in passive delay 341 samples the same point in waveform 111 as previously. This system can be advantageous when passing the test pulse through passive delay 231 is not feasible. Once again the samples should contain no test jitter.

The voltage samples are once again transferred to memory while retaining their time coherency by connecting input 553A of multiplexer 551 to the output 555 of the multiplexer in response to a control input signal at control input 557 supplied by one of the control outputs 641 of computer 611. Once the input 553A is connected to the output 555 the ADC 561, in response to a control signal received from one of the control outputs 641 of computer 611 converts the analog value at the output 555 to a digital number at the output 565 of ADC 561. This digital number is stored in register 571 in response to a control signal from the computer 611. Once the digital number is stored in register 571 the ADC 561 is deactivated by a control signal from computer 611. In response to a control signal from the computer 611 the register 571 transfers the digital number to the data input 621 of the computer 611 from which the digital number is transferred to a storage register in the digital memory 613. Once the ADC 561 has been deactivated the control input signal to multiplexer 551 is changed so that the multiplexer connects input 553B to output 555. Once the input 553B is connected to the output 555 the ADC 61 is reactivated by a control signal from computer 611 and the ADC 561 converts the analog value at output 555 to a digital number at its output 565. Once the register 571 has transmitted the previous digital number to the computer and the analog-to-digital converter 561 has converted its new input to a digital number the register 571 stores a new digital number in response to a control signal from computer 611. As before the ADC 561 is deactivated once the register 571 has stored the digital number. Register 571 again transfers the digital number to the data input 621 for transfer to a different storage location in the digital memory 613. Where more than two sampling gates are used the conversion process proceeds in the same manner through the succeeding samples. The multiplexer, the analog-to-digital converter, the register and the computer must operate at a high speed, in order that the last sample converted may be converted before the analog voltage on the last storage capacitor has experienced an amount of decay which would be detectable by the analog-to-digital converter. Provided this criterion is met with respect to each sample converted, the samples as stored in the digital memory 613 will still be free of any jitter introduced by the test system.

Where the system is doing a threshold detection, the operation of the threshold detection means is the same as in a preferred embodiment, except that detector 461 makes its detection when sampling gate 321 closes and detector 441 makes its detection later when sampling gate 311 closes rather than all the detections being made simultaneously.

Once the detection has been made, the multiplexer 581 is activated by computer 611. First input 583A is connected to output 585 and the condition of the output of the detector 441 is transmitted to data input 631 of computer 611. Next, the multiplexer 581 connects input 583B to output 585 to connect the output of detector 461 to data input 631 of computer 611. If more than two sampling gates are employed, the remaining detector outputs are transmitted to the data inputs 631 of computer 611 in the same manner. Once all the detectors have been interrogated by the multiplexer the detectors are reset and the system is ready to proceed with another measurement. It is preferred to store the detector's outputs in the digital memory 613, and to store the same indication of the time at which the samples were taken as was done in the previous example.

In both the preferred and the alternate embodiment the register 571, 531, and 541 may be part of the computer or the computer's memory.

It should be clear that if so desired some of the sampling gates may be used for taking samples, while in response to the same sampling pulse other sampling gates are being used to make threshold determinations.

Figure 3:
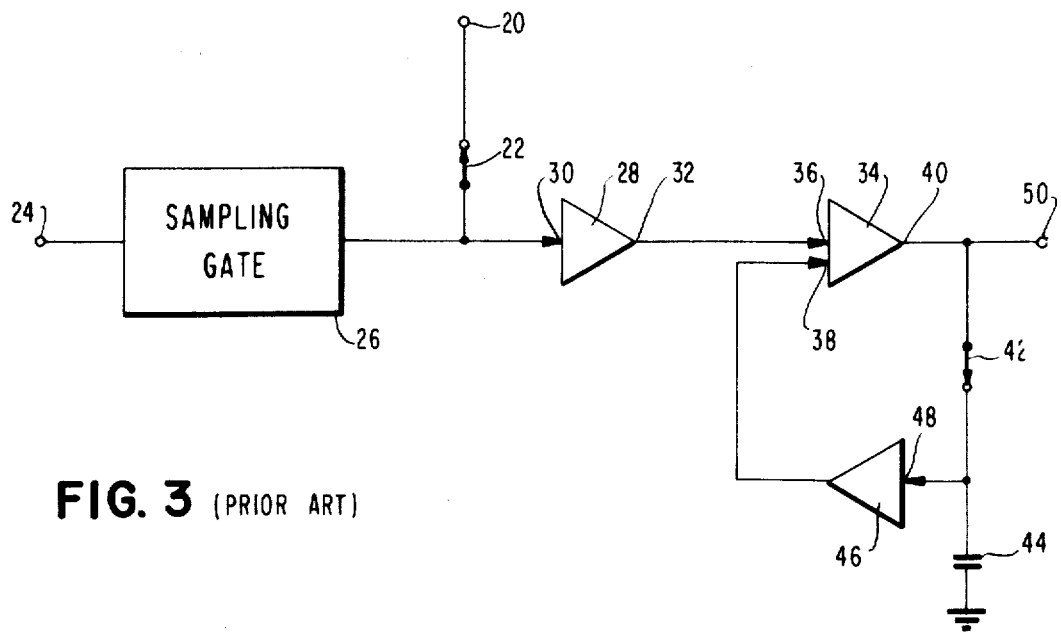
FIG. 3 is a prior art threshold test circuit.

The threshold determination means 401 is a significant improvement over the prior art system shown in FIG. 3. In FIG. 3, the terminal 20 is connected to the reference or threshold test voltage and switch 22 and switch 42 are closed and sampling gate 26 is open. DC amplifier 28 amplifies the reference voltage and supplies it as one input to a DC differential amplifier 34. The output of the DC differential amplifier is connected to storage capacitor 44 by switch 42. The output of amplifier 34 charges capacitor 44 and the voltage on capacitor 44 is amplified by DC amplifier 46 and supplied as the second input to the DC differential amplifier 34. Once capacitor 44 has charged to a steady state voltage the switch 42 and the switch 22 are opened simultaneously. The threshold determination is to be made by closing sampling gate 26 momentarily. The test waveform voltage at terminal 24 is amplified by DC amplifier 28 and supplied to the input 36 of DC differential amplifier 34. If the test waveform voltage is less than the reference voltage the output 50 from the test circuit goes down, if the test voltage is the same as reference voltage the output 50 does not change, and if the test voltage is greater than the reference voltage, the output 50 goes up. Thus, the output 50 bears the same relationship to the test waveform voltage at input 24 as applicants' voltage on their storage capacitor bears to the test waveform at the input of applicants' sampling gate. Although, both the prior art system and applicants' system provide similar data, applicants' system is much less complicated and less expensive to produce, since applicants' system contains no DC amplifiers and the prior art system requires three DC amplifiers, one of them being differential.

Figure 4:
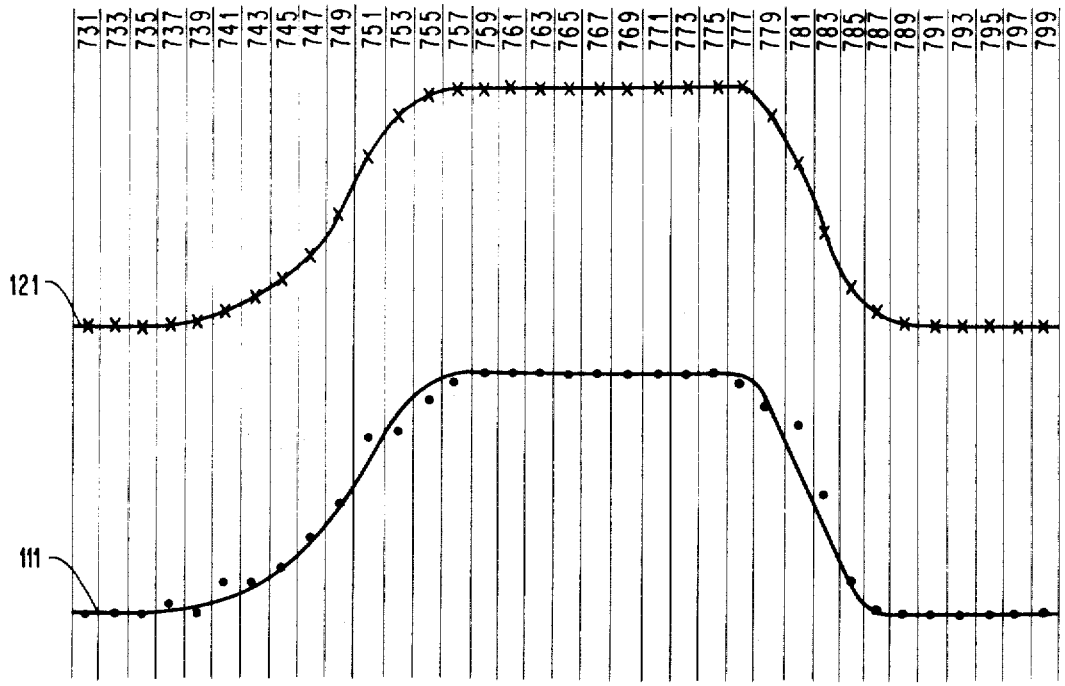
FIG. 4 shows the relationships between two signals reconstructed from simultaneous samples obtained by the circuitry of either FIG. 1 or FIG. 2.

FIG. 4 shows waveforms 111 and 121 as reconstructed from a series of samples taken using the simultaneous time coherent sampling system of FIG. 1. As has been stated above, there is jitter within each waveform from sample to sample, because of jitter in the sampling pulse generator response to the trigger signal. However, there is no jitter introduced by the test system between the samples taken simultaneously from waveform 111 and waveform 121, thus, the two samples 731 have no relative jitter and the two samples 733 have no relative jitter, etc. If the device under test 221 has a different gain than passive delay 231 or line 250, depending on whether the circuit of FIG. 1 or FIG. 2 was used to obtain the samples, the amplitude of the two waveforms must be made equal. Once the amplitude of the two waveforms has been made equal they may be subtracted and any variation of the difference from zero is a result of jitter introduced by the device under test 221.

While the invention has been particularly shown and described with reference to the preferred embodiments thereof and some variations thereon, it will be understood by those skilled in the art that various other changes in form and details may be made without departing from the spirit and scope of the invention.

What is claimed is:

1. A time coherent sampling system for obtaining simultaneous time coherent samples from a plurality of waveforms, comprising:
    a sampling pulse generator which provides a sampling pulse at its output;
    a plurality of sampling gates, each sampling gate having a control input, a signal input and a sample output;
    a plurality of temporary storage means;
    a permanent storage means;
    a passive delay with a signal input connected to the waveform to be sampled and the output of said delay connected to the sampling gates;
    the signal input of each one of the plurality of sampling gates being connected to the source of a different one of the plurality of waveforms to be sampled so that the sampling gates can sample the waveforms;
    the control input of each one of the plurality of sampling gates being connected to the output of the sampling pulse generator for simultaneous operation of the plurality of sampling gates to obtain a plurality of simultaneous samples, one from each waveform;
    the sample output of each one of the plurality of sampling gates being connected to a different one of the plurality of temporary storage means, for temporarily storing the sample output; and
    coherent sample transfer means connected between the plurality of temporary storage means and the permanent storage means, for transferring the plurality of sampled outputs from the temporary storage means to the permanent storage means, while retaining the time coherency of the sampled outputs.

2. The apparatus of claim 1 wherein:
    the permanent storage means is a digital memory, and
    the coherent transfer means comprises a plurality of analog-to-digital converters for simultaneously converting the plurality of sampled outputs stored in the temporary storage means to a corresponding plurality of digital values, each of the analog-to-digital converters having an analog input and a digital output, the analog input of each converter being connected to one of the plurality of temporary storage means, and the digital output of each of the converters being connected to the permanent storage means for transmission of the converter's digital output to the permanent storage means for permanent storage.

3. The apparatus of claim 2 wherein the temporary storage means is a capacitor.

4. The apparatus of claim 1 wherein the permanent storage means is a digital memory and the coherent transfer means comprises:
    an analog-to-digital converter for converting the plurality of samples to a corresponding plurality of digital numbers, the analog-to-digital converter having an analog input and a digital output;
    multiplexer means having a plurality of inputs and an output;
    each one of the plurality of temporary storage means being connected to a different one of the plurality of multiplexer inputs and the output of the multiplexer being connected to the analog input of the analog-to-digital converter for selective connection of each of the temporary storage means to the analog input of the analog-to-digital converter for conversion to the sample stored in that temporary storage means to a corresponding digital number in the analog-to-digital converter, and the output of the analog-to-digital converter being connected to the digital memory for transmission of the plurality of digital numbers to the digital memory for permanent storage in the digital memory.

5. The apparatus of claim 4 wherein the temporary storage means is a capacitor.

6. A time coherent sampling system for obtaining simultaneous time coherent samples from a plurality of waveforms, said plurality of waveforms being divided into first and second groups, wherein to obtain the desired information, the first group of waveforms must be sampled at a first time and the second group of waveforms must be sampled at a second later time, the system comprising:

a sampling pulse generator which provides a sampling pulse at its output;

a plurality of sampling gates, each having a control input, a signal input and a sample output;

a plurality of temporary storage means;

a permanent storage means;

a delay means having an input and an output and having a delay equal to the difference between the first time and the second time, the input of the delay means being connected to the output of the sampling pulse generator;

the plurality of sampling gates being divided into first and second groups, the signal input of each sampling gate in the first group of sampling gates being connected to the source of a different one of the waveforms in the first group of waveforms, and the control input of each sampling gate in the first group of the sampling gates being connected to the output of the sampling pulse generator so that the first group of sampling gates may be closed at the first time by the sampling pulse; the signal input of each sampling gate of the second group of sampling gates being connected to the source of a different one of the waveforms in the second group of waveforms, and the control input of each of the sampling gates in the second group of sampling gates being connected to the delay means, so that the second group of sampling gates may be closed at the second time in order to sample the second group of waveforms at the second time;

the sample output of each one of the plurality of sampling gates being connected to one of the plurality of temporary storage means, for temporarily storing the sample, and coherent sample transfer means connected between the plurality of temporary storage means and the permanent storage means, for transferring the plurality of samples from the temporary storage means to the permanent storage means, while retaining the time coherency of the samples.

7. The apparatus of claim 6 wherein:

the permanent storage means is a digital memory;

each temporary storage means is a capacitor, and the coherent transfer means comprises a plurality of analog-to-digital converters for simultaneously converting the plurality of sampled outputs stored on the capacitors to a corresponding plurality of digital values, each of the analog-to-digital converters having an analog input and a digital output, the analog input of each converter being connected to one of the plurality of capacitors and the digital output of each of the converters being connected to the digital memory for transmission of the converter's digital output to the digital memory for permanent storage.

8. The apparatus of claim 6 wherein the permanent storage means is a digital memory, each temporary storage means is a capacitor and the coherent transfer means comprises:

an analog-to-digital converter for converting the plurality of samples to a corresponding plurality of digital numbers, the analog-to-digital converter having an analog input and a digital output;

each one of the plurality of capacitors being connected to a different one of the plurality of multiplexer inputs and the output of the multiplexer being connected to the analog input of the analog-to-digital converter for selective connection of each of the capacitors to the analog input of the analog-to-digital converter for conversion of the sample stored on that capacitor to a corresponding digital number in the analog-to-digital converter, and the output of the analog-to-digital converter being connected to the digital memory for transmission of the plurality of digital numbers to the digital memory for permanent storage in the digital memory.

9. A time coherent sampling system for obtaining simultaneous time coherent samples from a plurality of waveforms, said waveforms being divided into first and second groups, wherein the waveforms in the first group must be sampled at a first time and the waveforms in the second group must be sampled at a later second time, in order to obtain the needed information, said system comprising:

a sampling pulse generator which provides a sampling pulse at its output;

a plurality of sampling gates, each sampling gate having a control input, a signal input and sample output;

a plurality of temporary storage means;

a permanent storage means;

a plurality of delay means each having an input and an output, each delay means having a delay equal to the time difference between the first time and the second time;

the input of each delay means being connected to the source of a different one of the waveforms in the first group of waveforms;

the signal input of each sampling gate in the first group of sampling gates being connected to the output of a different one of the plurality of delay lines;

the signal input of each one of the sampling gates in the second group of sampling gates being connected to the source of a different one of the waveforms in the second group of waveforms;

the control input of each one of the plurality of sampling gates being connected to the output of the sampling pulse generator for simultaneous operation of the plurality of the sampling gates, to obtain a plurality of simultaneous samples, one from each waveform;

the sample output of each one of the plurality of sampling gates being connected to one of the plurality of temporary storage means, for temporarily storing the sample, and coherent sample transfer means connected between the plurality of temporary storage means and the permanent storage means, for transferring the plurality of samples from the temporary storage means to the permanent storage means, while retaining the time coherency of the samples.

10. The apparatus of claim 9 wherein:

the permanent storage means is a digital memory;

each temporary storage means is a capacitor, and the coherent transfer means comprises a plurality of analog-to-digital converters for simultaneously converting the plurality of sampled outputs stored on the capacitors to a corresponding plurality of digital values, each of the analog-to-digital converters having an analog input and a digital output; the analog input of each converter being connected to one of the plurality of capacitors and the digital output of each of the converters being connected to the digital memory for transmission of the converter's digital output to the digital memory for permanent storage.

11. The apparatus of claim 9 wherein the permanent storage means is a digital memory, each temporary storage means is a capacitor and the coherent transfer means comprises:

- an analog-to-digital converter for converting the plurality of samples to a corresponding plurality of digital numbers, the analog-to-digital converter having an analog input and a digital output;
- multiplexer means having a plurality of inputs and an output;
- each one of the plurality of capacitors being connected to a different one of the plurality of multiplexer inputs and the output of the multiplexer being connected to the analog input of the analog-to-digital converter for selective connection of each of the capacitors to the analog input of the analog-to-digital converter for conversion of the sample stored on that capacitor to a corresponding digital number in the analog-to-digital converter, and
- the output of the analog-to-digital converter being connected to the digital memory for transmission of the plurality of digital numbers to the digital memory for permanent storage in the digital memory.

References Cited

UNITED STATES PATENTS

| 3,059,228 | 10/1962 | Beck et al. | 340—172.5 X |
| 3,484,689 | 12/1969 | Kerns | 328—151 X |
| 3,560,915 | 2/1971 | Elliott et al. | 340—18 |

CHARLES D. MILLER, Primary Examiner

U.S. Cl. X.R.

328—151